Feb. 24, 1925.
R. E. KOLBE
METHOD OF AND APPARATUS FOR FREEZING MATERIALS
Filed Sept. 12, 1923
1,527,562
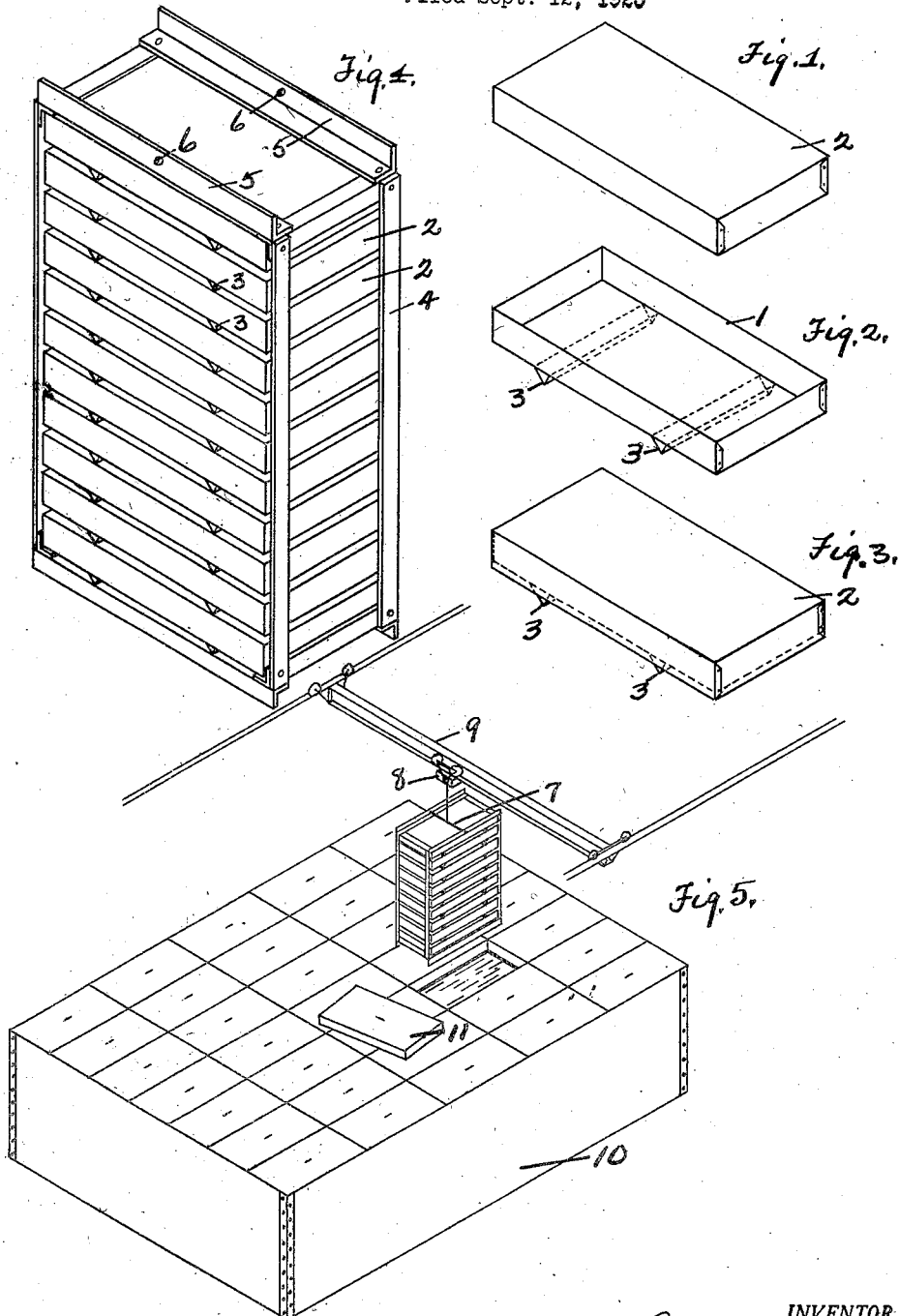
INVENTOR.
Robert E. Kolbe
BY
N. Z. Lord
ATTORNEYS.

Patented Feb. 24, 1925.

1,527,562

UNITED STATES PATENT OFFICE.

ROBERT E. KOLBE, OF ERIE, PENNSYLVANIA.

METHOD OF AND APPARATUS FOR FREEZING MATERIALS.

Application filed September 12, 1923. Serial No. 662,167.

*To all whom it may concern:*

Be it known that I, ROBERT E. KOLBE, a citizen of the United States, residing at Erie, in the county of Erie and State of Pennsylvania, have invented new and useful Improvements in the Method of and Apparatus for Freezing Materials, of which the following is a specification.

Comestibles such as fish, meats, etc., have been frozen by immersing them in a liquid refrigerant. With some methods the liquid is brought directly into contact with the materials to be frozen and in others the materials have been arranged in water-tight containers. There are objections to the direct application of the refrigerant to the material with most materials and where it has been attempted to protect the material from the refrigerant as by a water-tight container the methods and apparatus have involved disadvantages either as to handling or freezing.

With the improved method I confine the material to be frozen under an inverted air-tight receptacle and immerse this receptacle. The trapped air excludes the brine from the receptacle and thus without complication as to apparatus or methods of handling permits of the freezing of the material without direct contact of the refrigerant with the material. Other features and details of the invention will appear from the specification and claims.

The apparatus forming the subject matter of the invention and by which the process may be practiced is illustrated as follows:—

Fig. 1 shows a perspective view of the inverted receptacle.

Fig. 2 a similar view of an up-turned supporting receptacle.

Fig. 3 a similar view of the assembled receptacles.

Fig. 4 a perspective view of a rack in which a stack of receptacles may be placed for convenient handling.

Fig. 5 a perspective view of the freezing apparatus with the rack in position to be lowered into a refrigerant.

The material to be frozen, such as fish, is placed in the receptacle 1. Ordinarily the receptacle is shallow enough so that ordinarily the material to be frozen slightly more than fills the receptacle. The cover or inverted receptacle 2 is placed over the receptacle 1. The receptacle 2 is made air-tight in any convenient manner. The receptacle 1, however, may, if desired, have drain openings from which any drip from the material may pass prior to the freezing. The receptacle 2 is slightly deeper than the receptacle 1 so that its lower edge protrudes as they are placed telescopically together below the bottom of the receptacle 1. This overlap forms a clearance from which the air is displaced by liquid when the receptacle is immersed, the trapped air under the inverted receptacle finding a pressure balancing the immersing liquid with the liquid at a level of at or slightly below the bottom of the supporting container or receptacle. Thus the material in the supporting receptacle is kept from direct contact with the refrigerant even though openings are arranged in the receptacle 1.

The receptacles 1 are provided with projections 3 so that when the receptacles are stacked, one on top of another, there are spaces between the pairs of assembled containers for the entrance and circulation of the refrigerant. These supporting projections, therefore, should extend downwardly a sufficient distance to project below the edge of the inverted cover when in place.

The assembled containers are stacked in a rack 4. This may be conveniently made of angle iron or strap metal—a simple means by which the stack of containers may be handled. The rack has top bars 5 provided with openings 6 which may be engaged by a hook 7 of a hoist 8, the hoist operating on a crane 9 and being adapted to carry the rack over and lower it into the ordinary brine tank 10, such tanks being arranged with sectional covers 11 to permit of the immersion of the separate racks.

As before stated, the material should fully fill the receptacle 1 so that when the stack of receptacles is arranged in the rack the material in the different receptacles is slightly compressed and thus brought into intimate contact with the cooling surfaces of the pans. While I have shown the inverted pan as being of greater depth than the upturned pan it will be understood that this is a desirable means of providing a displacement space in that where it is so provided the supporting pan or receptacle 1 may be provided with drainage openings. It will be understood that this displacement space may be made by extending the cover laterally provided the bottom supporting receptacle is closed. Such an arrangement has some advantages in that it provides for a contact between the liquid refrigerant and the bottom of the receptacle 1 with certainty and without direct contact of the liquid with the material. The only necessity, therefore, is that the displacement space shall be such, taking into consideration the depth to which the receptacle is immersed and the space occupied by the material as to permit a sufficient compression of the trapped air to exclude the refrigerant from the interior of the receptacle 1.

What I claim as new is:—

1. The method of freezing materials which consists in confining them in an inverted air-trapping receptacle and submerging the receptacle in a liquid freezing medium.

2. The method of freezing materials which consists in confining them in pressed contact with walls of an inverted air-trapping receptacle and submerging the receptacle in a liquid freezing medium.

3. The method of freezing materials which consists in supporting the material in an up-turned receptacle, covering telescopically the up-turned receptacle with an inverted air-trapping receptacle, and immersing the assembled receptacles in a liquid freezing medium.

4. The method of freezing materials which consists in supporting the materials in an up-turned receptacle, covering telescopically the up-turned receptacle with an inverted air-trapping receptacle while compressing the material between the opposing walls of the receptacle, and immersing the assembled receptacles in a liquid freezing medium.

5. The method of freezing materials which consists in confining them in an inverted air-trapping receptacle, providing a displacement space in the receptacle, and immersing the receptacle in a liquid freezing medium, the displacement space having relation to the depth of immersion to prevent contact of the liquid with the material.

6. The method of freezing materials which consists in supporting the material in an up-turned receptacle, covering the same telescopically with an inverted air-trapping receptacle, the inverted receptacle having a displacement space outside the up-turned receptacle, and immersing the assembled receptacles in a liquid freezing medium, the depth of immersion and the clearance space having a relation to prevent the entrance of the liquid freezing medium to the up-turned receptacle.

7. The method of freezing materials which consists in confining the same in a plurality of inverted air-trapping receptacles, stacking said receptacles one upon another in spaced relation, and immersing the stack in a liquid freezing medium.

8. The method of freezing materials which consists in confining them in a plurality of inverted air-trapping receptacles, stacking said receptacles one upon another in spaced relation and exerting pressure throughout the stack to retain the material in pressed contact with the walls of the receptacle, and immersing the stack in a liquid freezing medium.

9. In an apparatus for freezing materials, the combination of an inverted air-trapping receptacle; means maintaining the material to be frozen in the receptacle; a freezing liquid medium in which the receptacle is immersed; and means for holding the receptacle immersed in the freezing liquid medium.

10. In an apparatus for freezing materials, the combination of an up-turned receptacle in which the material is placed; an inverted air-trapping receptacle telescopically arranged on the up-turned receptacle; a freezing liquid medium in which the assembled receptacles are immersed; and means for holding the receptacles immersed in the freezing liquid medium.

11. In an apparatus for freezing materials, the combination of an up-turned receptacle in which the material is supported; an inverted air-trapping receptacle telescopically covering the up-turned receptacle, said inverted receptacle having a size relatively to the up-turned receptacle to provide a displacement space outside the up-turned receptacle; a liquid freezing medium in which the liquid is immersed; and means for holding the receptacles immersed in the freezing liquid medium.

12. In an apparatus for freezing materials, the combination of a plurality of inverted air-trapping receptacles; means maintaining the material to be frozen in said receptacles in stacked relation; and a rack in which the stack is assembled.

13. In an apparatus for freezing materials, the combination of an up-turned receptacle in which the material is supported; and an inverted air-trapping receptacle telescopically covering the up-turned receptacle, said inverted receptacle having a size relatively to the up-turned receptacle to provide a displacement space outside the up-turned receptacle.

In testimony whereof I have hereunto set my hand.

ROBERT E. KOLBE.